United States Patent [19]
Watson et al.

[11] Patent Number: 5,411,578
[45] Date of Patent: May 2, 1995

[54] VACUUM SWING ADSORPTION PROCESS WITH MIXED REPRESSURIZATION AND PROVIDE PRODUCT DEPRESSURIZATION

[75] Inventors: Charles F. Watson, Orefield; Roger D. Whitley, Allentown; Rakesh Agrawal, Emmaus; Ravi Kumar, Allentown, all of Pa.

[73] Assignee: Air Products and Chemicals, Inc., Allentown, Pa.

[21] Appl. No.: 241,260

[22] Filed: May 10, 1994

[51] Int. Cl.$^6$ ............................................. B01D 53/47
[52] U.S. Cl. ........................................ 95/101; 95/105; 95/122; 95/130
[58] Field of Search ........................... 95/96–98, 95/100–105, 118, 119, 121, 122, 130, 139

[56] References Cited

U.S. PATENT DOCUMENTS

| | | | |
|---|---|---|---|
| 3,430,418 | 3/1969 | Wagner | 55/25 |
| 3,636,679 | 1/1972 | Batta | 55/26 |
| 3,717,974 | 2/1973 | Batta | 55/58 |
| 4,461,630 | 7/1984 | Cassidy et al. | 95/100 |
| 4,482,361 | 11/1984 | Whysall | 95/100 |
| 4,512,780 | 4/1985 | Fuderer | 95/130 X |
| 4,519,813 | 5/1985 | Hagiwara et al. | 95/101 |
| 4,589,888 | 5/1986 | Hiscock et al. | 55/26 |
| 4,599,094 | 7/1986 | Werner et al. | 95/101 |
| 4,650,501 | 3/1987 | Hiscock et al. | 55/26 |
| 4,684,377 | 8/1987 | Haruna et al. | 95/130 X |
| 4,723,966 | 2/1988 | Fuderer | 95/98 |
| 4,756,723 | 7/1988 | Sircar | 95/103 |
| 4,775,394 | 10/1988 | Yamano et al. | 95/101 |
| 4,810,265 | 3/1989 | Lagree et al. | 95/101 |
| 4,981,499 | 1/1991 | Hay et al. | 55/26 |
| 5,122,164 | 6/1992 | Hirooka et al. | 55/26 |
| 5,203,888 | 4/1993 | Maurer | 95/101 |
| 5,223,004 | 6/1993 | Eteve et al. | 55/26 |
| 5,226,933 | 7/1993 | Knaebel et al. | 95/96 |
| 5,232,473 | 8/1993 | Kapoor et al. | 95/101 |
| 5,246,676 | 9/1993 | Hay | 423/219 |
| 5,328,503 | 7/1994 | Kumar et al. | 95/101 |
| 5,330,561 | 7/1994 | Kumar et al. | 95/101 |

FOREIGN PATENT DOCUMENTS

WO93/10882 6/1993 WIPO.

*Primary Examiner*—Robert Spitzer
*Attorney, Agent, or Firm*—Geoffrey L. Chase; William F. Marsh

[57] ABSTRACT

A process for separating a feed gas mixture into a more strongly adsorbable component and a less strongly adsorbable component in a plurality of adsorbent beds containing an adsorbent selective for the more strongly adsorbable component with two cocurrent depressurizations, first to provide product and then to provide a purge gas, and using a combination of less strongly adsorbable component and feed gas mixture to repressurize the adsorbent bed. Oxygen product can be recovered from air at high recovery using the process.

12 Claims, 2 Drawing Sheets

VACUUM SWING ADSORPTION PROCESS WITH MIXED REPRESSURIZATION AND PROVIDE PRODUCT DEPRESSURIZATION

FIELD OF THE INVENTION

The present invention is directed to a vacuum swing adsorption process for the separation of a more strongly adsorbable component from a less strongly adsorbable component in a gas mixture with high recovery of the less strongly adsorbable component at approximately feed pressure. More specifically, the present invention is a vacuum swing adsorption process for the separation of air to recover oxygen as a relatively unadsorbed product at high recovery and approximately feed pressure using cocurrent depressurization to provide product gas followed by mixed repressurization.

BACKGROUND OF THE PRIOR ART

Oxygen is a commodity chemical in the industrial gas industry. It has numerous applications including waste water treatment, glass melting furnaces, and the steel industry. One of the most common methods of oxygen production is by cryogenic distillation of air. However, this technology is not competitive for small size oxygen plants (<100 TPD $O_2$). The technology of choice for this size range is adsorption. There is a need in the marketplace to produce oxygen at low capital and energy costs by adsorptive gas separation.

Adsorptive processes are extensively used in the industry to produce oxygen from air for small size oxygen plants (<100 TPD $O_2$). There are two major categories of these processes—pressure swing adsorption processes (PSA) and vacuum swing adsorption processes (VSA). The pressure swing adsorption processes carry out the adsorption (feed) step at pressures much higher than ambient and adsorbent regeneration at pressures close to ambient. The adsorbent beds go through secondary process steps, such as pressure equalizations, depressurizations, blowdowns, and purge or various combinations of these during the cycle. Typical of the $O_2$-PSA processes are U.S. Pat. Nos. 3,430,418; 4,589,888; 4,650,501 and 4,981,499.

Primary reasons for high energy consumption in PSA processes are: (1) $O_2$ recovery from these processes is low, and (2) the entire feed stream has to be compressed up to the adsorption pressure. These inefficiencies are somewhat circumvented in vacuum swing adsorption (VSA) processes. In these processes, adsorption is carried out at pressure close to ambient and adsorbent regeneration is carried out at sub-atmospheric levels. The adsorbent beds go through several secondary steps with the primary aim of increasing oxygen recovery and reducing adsorbent inventory per unit of product gas.

U.S. Pat. No. 3,636,679 discloses an adsorptive process which cocurrently depressurizes to provide simultaneous purge and product. The process does not include product production while feed gas is administered to the adsorptive bed.

U.S. Pat. No. 3,717,974 also discloses cocurrent depressurization to provide simultaneous purge and product. Such a process step is disadvantageous because it uses high purity cocurrent depressurization gas for purge even at the initial depressurization.

U.S. Pat. No. 5,122,164 describes an $O_2$ VSA process with the steps: adsorption, simultaneous cocurrent depressurization and countercurrent evacuation, countercurrent evacuation, vacuum purge, pressure equalization with gas from a bed undergoing cocurrent depressurization and product repressurization.

U.S. Pat. No. 5,223,004 describes an $O_2$ VSA process with the steps: adsorption, simultaneous cocurrent depressurization and countercurrent evacuation, countercurrent evacuation, purge, repressurization with product and cocurrent depressurization gas from another bed and repressurization with product and feed.

U.S. Pat. No. 5,246,676 describes a process for producing oxygen from air containing at least three beds and undergoing the following steps: adsorption, countercurrent evacuation including at least two successive pumping sub-steps, and product repressurization. Various options on the cycle include; cocurrent depressurization to provide purge gas to the bed under vacuum, further cocurrent depressurization to provide partial repressurization gas, and cocurrent depressurization to a storage tank from where some of the purge gas is withdrawn.

French Patent W093/10882 describes an oxygen VSA process which incorporates two stages of evacuation. Each stage is carried out by a separate vacuum machine. These machines could be of the same type or different type, e.g. volumetric and centrifugal.

Despite the prior art, a need still exists for an $O_2$ VSA process with higher oxygen recovery (i.e., lower energy costs) and lower adsorbent requirement per unit of oxygen production (i.e., lower capital costs) than the current processes. The present invention outlines a vacuum swing adsorption (VSA) process to produce oxygen from air at higher oxygen recovery and lower adsorbent requirement per unit of oxygen product than current $O_2$ VSA processes.

BRIEF SUMMARY OF THE INVENTION

The present invention is a process for selectively separating a more strongly adsorbable component from a less strongly adsorbable component of a feed gas mixture in a plurality of adsorption beds containing an adsorbent selective for the more strongly adsorbable component, comprising the steps of:

(a) introducing a feed gas mixture at elevated pressure containing the more strongly adsorbable component and the less strongly adsorbable component into an inlet of a first adsorption bed containing an adsorbent selective for the more strongly adsorbable component and adsorbing the more strongly adsorbable component on the adsorbent while the less strongly adsorbable component passes through the first bed unadsorbed as a product and as a source of product repressurization gas for a bed of said plurality of adsorption beds undergoing product repressurization of step (f) and continuing until the adsorption front of the more strongly adsorbable component approaches an outlet of the first bed and terminating the introduction of the feed gas mixture;

(b) following the termination of the introduction of the feed gas mixture into the first bed, cocurrently depressurizing the first bed to a lower pressure to remove a cocurrent depressurization gas from the first bed and recovering the cocurrent depressurization gas as product;

(c) further cocurrently depressurizing the first bed to a second lower pressure to remove a cocurrent depressurization gas and passing this cocurrent depressurization gas to the outlet of a bed of the plurality of adsorption beds undergoing purge of step (e);

(d) countercurrently evacuating the first bed under vacuum conditions to remove the more strongly adsorbable component;

(e) countercurrently purging the first bed with the cocurrent depressurization gas from a bed of the plurality of adsorption beds undergoing step (c) to remove additional more strongly adsorbable component from the first bed;

(f) partially repressurizing the first bed with the less strongly adsorbable component gas from a bed of the plurality of adsorption beds undergoing the adsorption of step (a);

(g) further repressurizing the first bed with elevated pressure feed gas mixture; and (h) performing steps (a) through (g) in each of the plurality of adsorption beds in a phased sequence.

Alternatively, the bed is partially repressurized in step (f) simultaneously with ambient pressure feed gas mixture.

Further alternatively, a pressure equalization step can be performed after the purge step (e) and before the partial repressurization step (f). In this case, the source of pressure equalization gas is cocurrent depressurization gas obtained simultaneously from the bed undergoing countercurrent evacuation in step (d).

Preferably, the feed gas mixture is air, the more strongly adsorbable component is nitrogen and the less strongly adsorbable component is oxygen.

Preferably, the process is carried out in three or more adsorption beds.

The present invention is further a process for selectively separating nitrogen from oxygen in air in three or more adsorption beds containing an adsorbent selective for nitrogen, comprising the steps of:

(a) introducing feed air at elevated pressure into an inlet of a first adsorption bed containing an adsorbent selective for nitrogen and adsorbing nitrogen on the adsorbent while oxygen passes through the first bed unadsorbed as a product and as a source of product repressurization gas for an adsorption bed undergoing the product repressurization of step (f) until the adsorption front of nitrogen approaches an outlet of the first bed and terminating the introduction of air into the first bed;

(b) following the termination of the introduction of air into the first bed, cocurrently depressurizing the first bed to remove a cocurrent depressurization gas from the first bed and recovering the cocurrent depressurization gas as product;

(c) further cocurrently depressurizing the first bed to a second lower pressure to remove a cocurrent depressurization gas and passing this cocurrent depressurization gas to the outlet of an adsorption bed undergoing purge of step (e);

(d) countercurrently evacuating the first bed under vacuum conditions to remove nitrogen from the first bed;

(e) countercurrently purging the first bed with cocurrent depressurization gas from an adsorption bed undergoing step (c) to remove additional nitrogen from the first bed;

(f) partially repressurizing the first bed with oxygen product gas from an adsorption bed undergoing the adsorption of step (a);

(g) further repressurizing the first bed with elevated pressure feed air; and (h) performing steps (a) through (g) in each adsorption bed in a phased sequence.

Alternatively, the first bed is partially repressurized in step (f) simultaneously with ambient air.

Further alternatively, a pressure equalization step can be performed after the purge step (e) and before the partial repressurization step (f). In this case, the source of pressure equalization gas is cocurrent depressurization gas obtained simultaneously from the bed undergoing countercurrent evacuation in step (d).

Preferably, the feed air is at a pressure in the range of approximately 15-30 psia.

More preferably, the feed air is at a pressure in the range of approximately 15-24 psia.

DETAILED DESCRIPTION OF THE INVENTION

The present invention will now be described with regard to several preferred embodiments with the initial embodiment utilizing three adsorption beds and the second embodiment utilizing four adsorption beds.

Both have the following steps:
1. Adsorption (A),
2. Cocurrent depressurization (DP1) to provide product,
3. Cocurrent depressurization (DP2) to provide purge,
4. Countercurrent evacuation (DES),
5. Countercurrent purge (PU),
6. Simultaneous product (PRP) and ambient air (AARP) repressurization,
7. Feed repressurization (FRP) using high pressure (15-30 psia) feed.

A process cycle chart for the three bed option is outlined in Table 1. A process cycle chart for the four bed option is outlined in Table 2.

TABLE 1

Three Bed O$_2$ VSA

| Bed # | | | | | | | | | |
|---|---|---|---|---|---|---|---|---|---|
| A | | A | | DP1 | DP2 | DES | | PU | PRP/AARP | FRP |
| B | PU | PRP/AARP | | FRP | | A | | DP1 | DP2 | DES |

TABLE 1-continued
Three Bed O₂ VSA

| Bed # | | | | | | | | |
|---|---|---|---|---|---|---|---|---|
| C | DP2 | DES | PU | PRP/AARP | FRP | A | DP1 | |

A — Adsorption (Feed)
DP1 — First Cocurrent Depressurization to Provide Product
DP2 — Second Cocurrent Depressurization to Provide Purge
DES — Countercurrent Evacuation
PU — Countercurrent Vacuum Purge
PRP — Product Repressurization
AARP — Ambient Air Repressurization
FRP — Feed Repressurization

TABLE 2

Four Bed O₂ VSA

| Bed # | | | | | | | | | | | | |
|---|---|---|---|---|---|---|---|---|---|---|---|---|
| A | | A | | DP1 | | DP2 | | PRP AARP | | DES | | |
| B | | DES PRP AARP | | | | PU | | FRP | | DP1 | | |
| C | PU | | FRP | | | | A | | DP1 | | PU DP2 DES | | PRP AARP | | FRP |
| D | DP2 | | | | DES | | DP2 PU | | PRP AARP | | FRP | | A | | DES | | DP1 |

Process steps for both embodiments will now be described in detail:

1. Adsorption Step (A), which consists of:
   a. Flowing the feed gas stream, consisting of atmospheric air at a pressure of 15–30 psia and temperature of ~0°–150° F. through a bed packed with one or more adsorbents capable of selectively adsorbing water, carbon dioxide, and nitrogen from air.
   b. Withdrawing an effluent stream consisting of $O_2$ product at feed pressure. Part of this stream is immediately used as repressurization gas for bed on step 6 and the remainder constitutes oxygen product.
   c. Continuing steps 1(a) and 1(b) for a predetermined cycle time or until the concentration of nitrogen impurity in the effluent stream reaches a preset limit. The bed is now called "spent" because it has exhausted its capacity for removing nitrogen from feed gas.
2. Cocurrent Depressurization Step (DP1), which consists of:
   a. Discontinuing the feed flow through the spent bed and transferring the feed to another VSA bed.
   b. Reducing the pressure in the spent VSA bed from the adsorption pressure level to some "intermediate" level (12–25 psia) by leaving the product end of this bed connected to the product header.
   c. Discontinuing the above step after a predetermined cycle time or when the pressure in the spent VSA bed has reached the predetermined intermediate pressure level.
3. Cocurrent Depressurization Setp (DP2), which consists of:
   a. Further reducing the pressure in the spent VSA bed from "intermediate level" to some "lower level" (7–20 psia) by connecting the product end of this bed with the product end of the VSA bed on step 5 of its cycle.
   b. Discontinuing the above step after a predetermined cycle time or when the pressure in the spent VSA bed has reached the predetermined "lower level."
4. Countercurrent Evacuation Step (DES), which consists of:
   a. Further reducing the pressure in the spent bed from lower level to the "lowest" level (1.0–10.0 psia) by connecting the feed end of the spent VSA bed to a vacuum pump.
   b. Continuing the above step for a predetermined cycle time or until the pressure in the VSA bed has reached the predetermined lowest pressure level.
5. Countercurrent Purge Step (PU), which consists of:
   a. Continuing evacuation of the VSA bed from the feed end.
   b. Connecting the product end of this bed with another VSA bed on step 3 of its cycle.
   c. Continuing the above steps for a predetermined cycle time or until pressure in this bed has reached a "low" level (2–12 psia) and pressure in the VSA bed on step 3 has reached the lower pressure level.
6. Product Repressurization Step (PRP), which consists of:
   a. Connecting the product end of the regenerated bed with the product end of the bed on step 1 of its cycle.
   b. Continuing the above step until pressure in the regenerated bed is close to or equal to ambient pressure. OR Simultaneous Product and Ambient Air Repressurization (PRP/AARP), which consists of:
   c. Connecting the product end of the regenerated bed with the product end of the bed on step 1 of its cycle and opening the feed end of the regenerated bed to ambient air.
   d. Continuing the above step until pressure in the regenerated bed is close to or equal to ambient pressure.
7. Feed Repressurization Step, which consists of:
   a. Discontinuing the product and ambient air repressurization.
   b. Connecting the feed end of the partially repressurized bed to the feed blower.
   c. Continuing the above step until the pressure in the bed is equal to the predetermined adsorption pressure.

The bed is now ready to undergo a new cycle starting from step 1(a).

Figure 1:
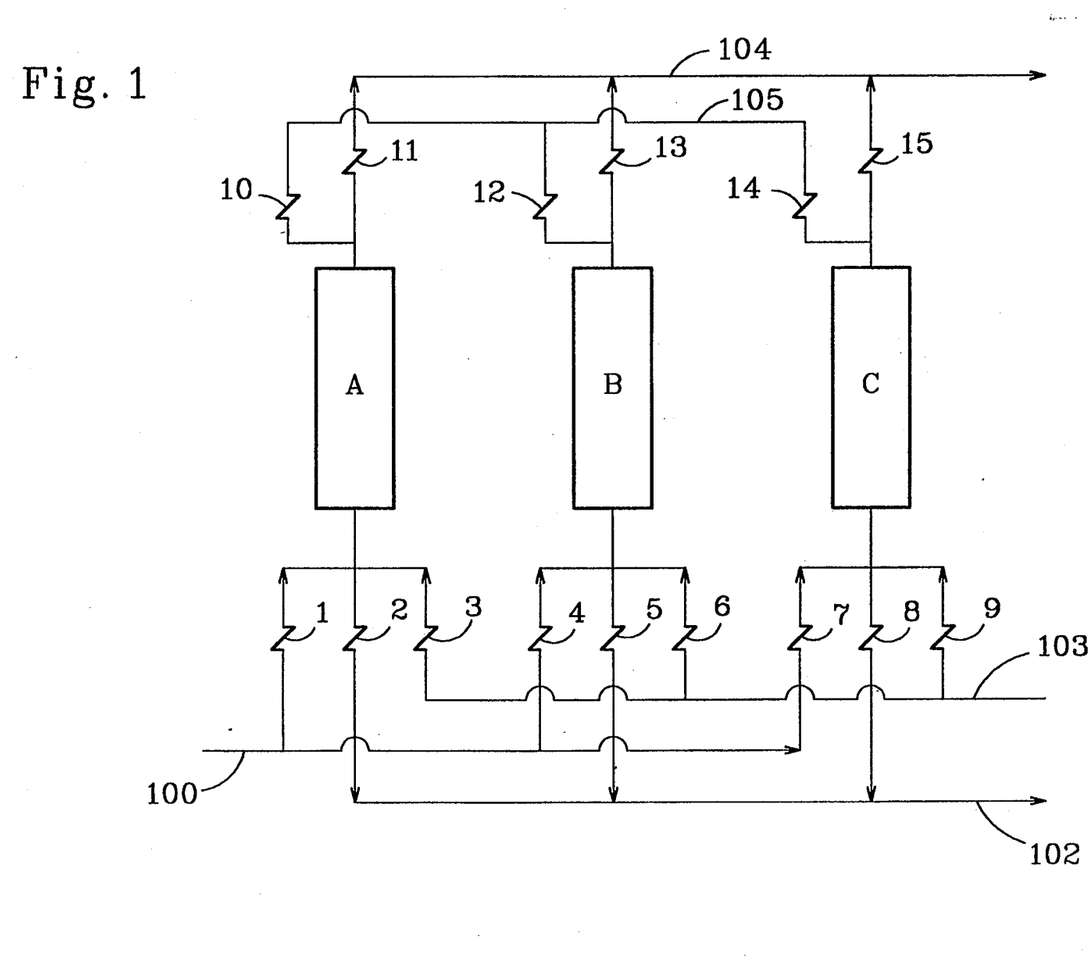
FIG. 1 is a schematic drawing of a preferred embodiment of the present invention using three parallel adsorption beds and appropriate valve manifolding for feed, product withdrawal, evacuation, purge, and repressurization.

Flow schematic and hardware will be somewhat different for each of the process options of the present invention. FIG. 1 depicts a schematic for the first preferred embodiment with three adsorbers. Table 3 outlines the corresponding valve sequence for a typical cycle time. Detailed process description of the cycle at typical operating conditions for the process option described in FIG. 1 and Tables 1 and 3 is given below:

Ambient air compressed to feed pressure (21 psia) by a feed blower enters through manifold 100 and open valve 1 into first Bed A, which has been already pressurized to adsorption pressure. The Bed is packed with adsorbent(s) selective for the removal of water, carbon dioxide, and nitrogen from air. Oxygen product is withdrawn via open valve 11 and manifold 104. Feed flow is switched to Bed B via open valve 4 after a predetermined time or as soon as nitrogen concentration in the effluent from Bed A reaches a preset limit. Pressure in Bed A is reduced by continuing to withdraw product gas via open valve 11 and manifold 104 until Bed B reaches adsorption pressure. Valve 11 is then closed and valve 13 opens to provide continuous product withdrawal. Pressure in Bed A is further reduced by opening valve 10 and providing purge gas to Bed C via manifold 105 and open valve 14. Bed C is being evacuated via open valve 8 and manifold 102. Valves 10, 14, and 8 are kept open for a predetermined time or until pressure in Bed A reaches ~14.5 psia. Valve 10 is now closed and Bed A is evacuated via open valve 2 and manifold 102. Valves 12 and 10 are opened at the end of the provide product (DP1) step in Bed B and upon reaching of evacuation level pressure ~4 psia in Bed A. Valves 2, 10, and 12 are kept open for a predetermined time or until pressure in Bed B reaches 14.5 psia to vacuum purge Bed A through manifold 105. Valves 2 and 12 are then closed and valves 3 and 14 are opened for simultaneous ambient feed air and product repressurization through manifolds 103, which is a source of ambient air, and 105, respectively. Valves 3, 10, and 14 are kept open until pressure in Bed A reaches ~14.5 psia. At this time, valves 3, 10, and 14 are closed and valve 1 is opened. Bed A is now pressurized up to adsorption pressure ~21 psia with high pressure feed air in manifold 100. Valve 11 is then opened to remove product oxygen through manifold 104. Bed A is now ready to start a new cycle. Each bed goes through a similar sequence of operation.

TABLE 3

Valve Sequence: 3 Bed O₂ VSA

| Time (sec) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0–10 | o |  |  |  | o |  |  |  |  |  | o | o |  | o |  |
| 10–20 | o |  |  | o |  | o |  | o |  | o | o | o |  |  |  |
| 20–30 |  |  | o |  |  |  |  | o |  |  |  | o |  |  |  |
| 30–40 |  |  | o |  |  |  |  | o |  | o |  |  | o | o |  |
| 40–50 |  | o | o |  |  |  |  |  | o |  |  | o | o | o |  |
| 50–60 |  | o |  |  |  | o |  |  |  |  |  | o |  |  |  |
| 60–70 |  | o |  |  |  | o |  |  |  | o |  | o |  |  | o |
| 70–80 |  |  | o |  | o | o |  |  |  | o |  |  |  | o | o |
| 80–90 | o |  |  |  | o |  |  |  |  |  |  |  |  |  | o | o = open, otherwise closed

Table 4 outlines valve sequence for the second preferred embodiment with 4 adsorbers. Valve numbers refer to FIG. 2 and the cycle is outlined in Table 2.

Figure 2:
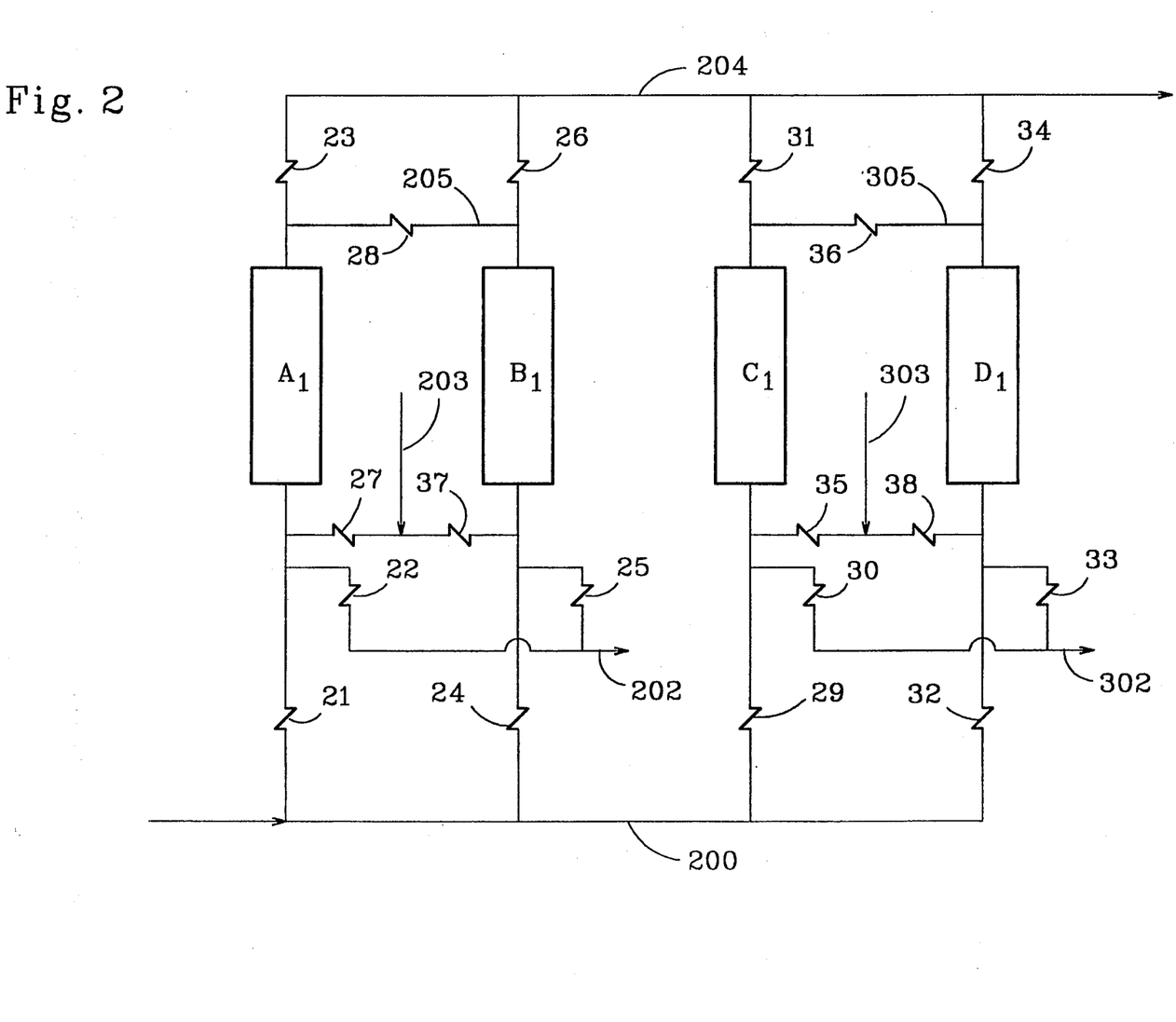
FIG. 2 is a schematic drawing of a second preferred embodiment of the present invention using four parallel adsorption beds and appropriate valve manifolding for feed, product withdrawal, evacuation, purge, and repressurization.

FIG. 2 depicts a schematic for the second preferred embodiment with four adsorbers. Table 4 outlines the corresponding valve sequence for a typical cycle time. Detailed process description of the cycle at typical operating conditions for the process option described in FIG. 2 and Tables 2 and 4 is given below:

Ambient air compressed to feed pressure (21 psia) by a feed blower enters through manifold 200 and open valve 21 into first Bed $A_1$, which has been already pressurized to adsorption pressure. The Bed is packed with adsorbent(s) selective for the removal of water, carbon dioxide, and nitrogen from air. Oxygen product is withdrawn via open valve 23 and manifold 204. Feed flow is switched to Bed $C_1$ via open valve 29 after a predetermined time or as soon as nitrogen concentration in the effluent from Bed $A_1$ reaches a preset limit. Pressure in Bed $A_1$ is reduced by continuing to withdraw product gas via open valve 23 and manifold 204 until Bed $C_1$ reaches adsorption pressure. Valve 23 is then closed and valve 31 opens to provide continuous product withdrawal. Pressure in Bed $A_1$ is further reduced by opening valve 28 and providing purge gas to Bed $B_1$ via manifold 205. Bed $B_1$ is being evacuated via open valve 25 and manifold 202. Valves 28 and 25 are kept open for a predetermined time or until pressure in Bed $A_1$ reaches ∼14.5 psia. Valve 25 and 28 are now closed and Bed $A_1$ is evacuated via open valve 22 and manifold 202. Valve 28 is opened at the end of the provide product (DP1) step in Bed $B_1$ and upon reaching of evacuation level pressure ∼4 psia in Bed $A_1$. Valves 28 and 22 are kept open for a predetermined time or until pressure in Bed $B_1$ reaches 14.5 psia to vacuum purge Bed $A_1$ through manifold 205. Valve 25 and 28 are then closed and valves 27 and 23 are opened for simultaneous ambient feed air and product repressurization through manifolds 203, which is a source of ambient air, and 204, respectively. Valves 27 and 23 are kept open until pressure in Bed $A_1$ reaches ∼14.5 psia. At this time, valves 27 and 23 are closed and valve 21 is opened. Bed $A_1$ is now pressurized up to adsorption pressure ∼21 psia with high pressure feed air in manifold 200. Valve 23 is then opened to remove product oxygen through manifold 204. Bed $A_1$ is now ready to start a new cycle. Each Bed $A_1$, $B_1$, $C_1$ and $D_1$ goes through a similar sequence of operation using manifolds 200, 202, 203, 204, 205, 302, 303 and 305, respectively.

TABLE 4

Valve Sequence: 4 Bed O₂ VSA

| Time (sec) | 21 | 22 | 23* | 24 | 25 | 26* | 27 | 28 | 29 | 30 | 31* | 32 | 33 | 34* | 35 | 36 | 37 | 38 |
|---|---|---|---|---|---|---|---|---|---|---|---|---|---|---|---|---|---|---|
| 0–8 | o |  | o |  | o |  |  |  | o |  |  |  |  |  | o |  |  |  |
| 8–17 | o |  | o |  | o |  |  |  |  |  | o* |  | o |  | o |  |  |  |
| 17–22 |  |  | o |  | o |  |  |  | o |  |  |  | o |  |  |  |  |  |
| 22–30 |  |  |  |  | o |  |  | o | o |  | o |  | o |  |  |  |  |  |
| 30–39 |  | o |  |  |  | o* |  |  | o |  | o |  | o |  |  | o |  |  |
| 39–44 |  | o |  | o |  |  |  |  |  |  | o |  | o |  |  |  |  |  |
| 44–52 |  | o |  | o | o |  |  |  |  |  |  |  | o |  | o |  |  |  |
| 52–61 |  | o |  | o | o |  |  |  |  | o |  |  |  | o* |  |  |  | o |
| 61–66 |  | o |  |  | o |  |  |  |  | o |  | o |  |  |  |  |  |  |
| 66–74 |  | o |  |  |  |  |  | o |  | o |  | o | o |  |  |  |  |  |
| 74–83 |  |  | o* |  | o |  | o |  |  | o |  | o | o |  |  |  |  |  |
| 83–88 | o |  |  |  | o |  |  |  |  | o |  |  | o |  |  |  |  |  |

* Valves with positioners
o Valves open, otherwise closed

EXAMPLES

The first preferred embodiment was tested in a 40 ton per day O₂ VSA plant containing three 12′ diameter by 8′ T/T adsorber vessels. These vessels were packed with two types of adsorbent. Zeolite NaX to remove water and carbon dioxide was packed towards the feed end of the adsorbers and a $N_2/O_2$ selective CaX type zeolitic material was packed toward the product end. Oxygen product purity of 92% was achieved.

Table 5 below compares the performance of the first preferred embodiment with a comparison process in which the cocurrent depressurization-provide product step is not employed and repressurization is carried out with product gas in order to maintain continuous product flow. It will be observed that the first preferred embodiment of the present invention requires approximately 10% less air blower power to achieve the same adsorbent productivity:

TABLE 5

|  | Application S.N. 08/037,070 | Present Invention |
|---|---|---|
| Oxygen Production, TPD | 42 | 42 |
| Feed Blower Power, KW | 260 | 210 |
| Vacuum Blower Power, KW | 250 | 250 |
| Total Power, KW | 510 | 460 |

Use of the cocurrent depressurization-provide product step improves efficiency in several ways. High purity oxygen, which is still present in the void space of the adsorber at the end of the adsorption step, is recovered as product. The low mass flow rates present during the cocurrent depressurization-provide product step decrease the length of the mass transfer zone and allow additional high purity product to be extracted from the adsorber. In the cycle of application Ser. No. 08/037,070 where cocurrent product and product repressurization streams are withdrawn from the outlet of the adsorber throughout the adsorption step, mass flow rates remain high for the entire step, and this enhanced recovery is not possible. A second advantage of the present invention is that the cocurrent depressurization-provide product step allows the air blower to be direct coupled to another adsorber during the latter half of the repressurization step without disrupting the continuous flow of product gas. Direct coupling the feed blower to the bed undergoing repressurization lowers the average discharge pressure and power consumption of the feed blower during that step. A third advantage of the present invention is the absence of any steps which approach upward fluidization velocities. This allows the cycle to be run faster than prior art cycles thereby giving high adsorbent productivity without the need for expensive bed hold-down devices.

The second preferred embodiment is ideally suited for large O$_2$ VSA plants greater than 85 tons per day capacity. To produce more than 85 tons per day, two or more vacuum systems are required because of limitations in the size of the positive displacement blowers which are used for O$_2$ VSA service. It is common practice to build two half-size plants for requirements greater than 85 tons per day. Table 6 below simulates the performance of the second preferred embodiment with a comparison process employing two vacuum trains in which the provide product step is not employed and operation of the four adsorbers is not integrated. It will be observed that the second preferred embodiment requires less power to obtain the same adsorbent productivity. Since product gas is produced continuously, there is no need for a large product surge tank either.

TABLE 6

|  |  | Application SN 08/191,401 | Present Invention |
|---|---|---|---|
| Oxygen Production, TPD |  | 110 | 110 |
| Number of Adsorbers |  | 4 | 4 |
| Number of Vacuum Systems |  | 2 | 2 |
| Number of Feed Blowers |  | 1 or 2 | 1 |
| Product Surge Tank Volume, ft$^3$ |  | 10,000 | 0 |
| Oxygen Recovery, % |  | 47 | 52 |
| Adsorbent Productivity, | TPD Oxygen ton adsorbent | 1.37 | 1.42 |
| Air Blower Power, KW |  | 288 | 276 |
| Vacuum Blower, KW |  | 794 | 750 |
| Total Power, KW |  | 1082 | 1026 |

The present invention has been set forth with regard to several preferred embodiments, but the full scope of the present invention should be ascertained from the following claims.

We claim:

1. A process for selectively separating a more strongly adsorbable component from a less strongly adsorbable component of a feed gas mixture in a plurality of adsorption beds containing an adsorbent selective for said more strongly adsorbable component, comprising the steps of:

(a) introducing said feed gas mixture at elevated pressure containing said more strongly adsorbable component and said less strongly adsorbable component into an inlet of a first adsorption bed containing said adsorbent selective for said more strongly adsorbable component and adsorbing said more strongly adsorbable component on said adsorbent while said less strongly adsorbable component passes through said first bed unadsorbed as a product and as a source of product repressurization gas for a bed of said plurality of adsorption beds undergoing product repressurization of step (f) and continuing until the adsorption front of said more strongly adsorbable component approaches an outlet of said first bed and terminating the introduction of said feed gas mixture;

(b) following the termination of the introduction of said feed gas mixture into said first bed, cocurrently depressurizing said first bed to a lower pressure to remove a cocurrent depressurization gas from said first bed and recovering the cocurrent depressurization gas as product;

(c) then further cocurrently depressurizing said first bed to a second lower pressure to remove a cocurrent depressurization gas and passing this cocurrent depressurization gas to the outlet of a bed of the plurality of adsorption beds undergoing purge of step (e);

(d) countercurrently evacuating said first bed under vacuum conditions to remove said more strongly adsorbable component;

(e) countercurrently purging said first bed with said cocurrent depressurization gas from a bed of the plurality of adsorption beds undergoing step (c) to remove additional more strongly adsorbable component from said first bed;

(f) partially repressurizing said first bed with said less strongly adsorbable component gas from a bed of the plurality of adsorption beds undergoing the adsorption of step (a);

(g) further repressurizing said first bed with elevated pressure feed gas mixture; and (h) performing steps (a) through (g) in each of the plurality of adsorption beds in a phased sequence.

2. The process of claim 1 wherein said first bed is partially repressurized in step (f) simultaneously with ambient pressure feed gas mixture.

3. The process of claim 1 wherein a pressure equalization step is performed after the purge step (e) and before the partial repressurization step (f) with cocurrent depressurization gas obtained simultaneously from the bed undergoing countercurrent evacuation in step (d).

4. The process of claim 1 wherein said feed gas mixture is air.

5. The process of claim 4 wherein said more strongly adsorbable component is nitrogen.

6. The process of claim 4 wherein said less strongly adsorbable component is oxygen.

7. The process of claim 1 wherein the process is carried out in three or more adsorption beds.

8. A process for selectively separating nitrogen from oxygen in air in three or more adsorption beds containing an adsorbent selective for nitrogen, comprising the steps of:

(a) introducing feed air at elevated pressure into an inlet of a first adsorption bed containing an adsorbent selective for nitrogen and adsorbing nitrogen on said adsorbent while oxygen passes through said first bed unadsorbed as a product and as a source of product repressurization gas for a bed undergoing the product repressurization of step (f) until the adsorption front of nitrogen approaches an outlet of said first bed and terminating the introduction of air into said first bed;

(b) following the termination of the introduction of air into said first bed, cocurrently depressurizing said first bed to remove a cocurrent depressurization gas from said first bed and recovering said cocurrent depressurization gas as product;

(c) further cocurrently depressurizing said first bed to a second lower pressure to remove additional cocurrent depressurization gas and passing said additional cocurrent depressurization gas to an outlet of an adsorption bed undergoing purge of step (e);

(d) countercurrently evacuating said first bed under vacuum conditions to remove nitrogen from said first bed;

(e) countercurrently purging said first bed with cocurrent depressurization gas from an adsorption bed undergoing step (c) to remove additional nitrogen from said first bed;

(f) partially repressurizing said first bed with oxygen product gas from an adsorption bed undergoing the adsorption of step (a);

(g) further repressurizing said first bed with elevated pressure feed air; and (h) performing steps (a) through (g) in each adsorption bed in a phased sequence.

9. The process of claim 8 wherein said first bed is partially repressurized in step (f) simultaneously with ambient pressure air.

10. The process of claim 8 wherein a pressure equalization step is performed after the purge step (e) and before the partial repressurization step (f) with cocurrent depressurization gas obtained simultaneously from a bed undergoing countercurrent evacuation in step (d).

11. The process of claim 8 wherein said feed air is at a pressure in the range of approximately 15–30 psia.

12. The process of claim 11 wherein said feed air is at a pressure in the range of approximately 15–24 psia.

* * * * *